Nov. 18, 1924.  
F. B. YINGLING  
AUTOMATIC TILE PRESS  
Filed June 20, 1922  
1,515,918  
8 Sheets-Sheet 6
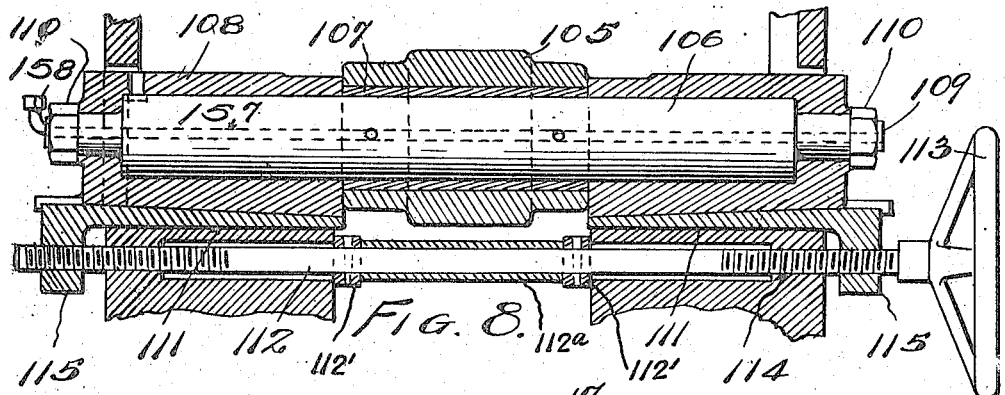
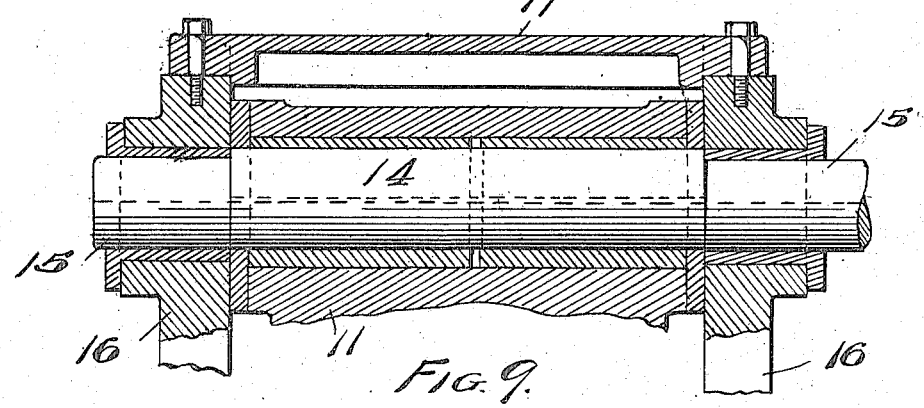
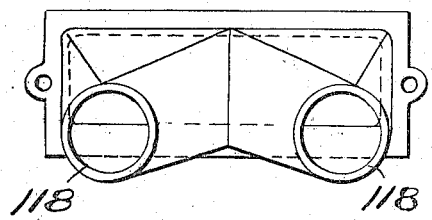
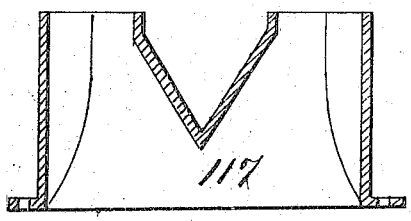
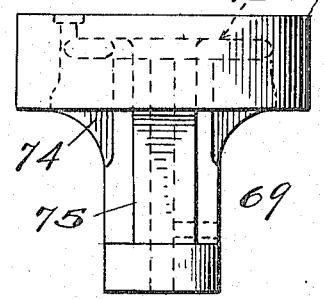
Inventor  
F. B. YINGLING  
Fenelon B. Brock  
Attorney

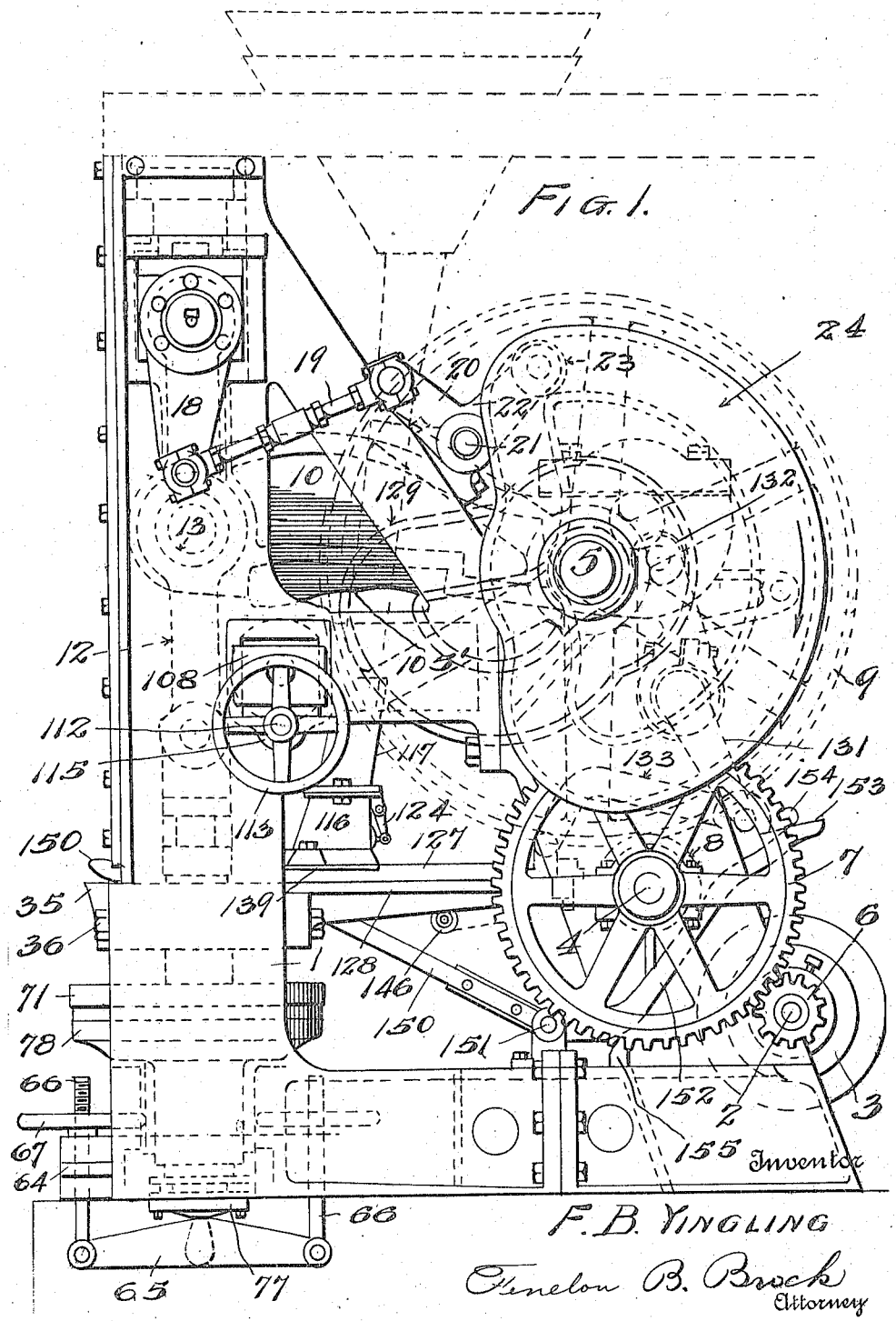

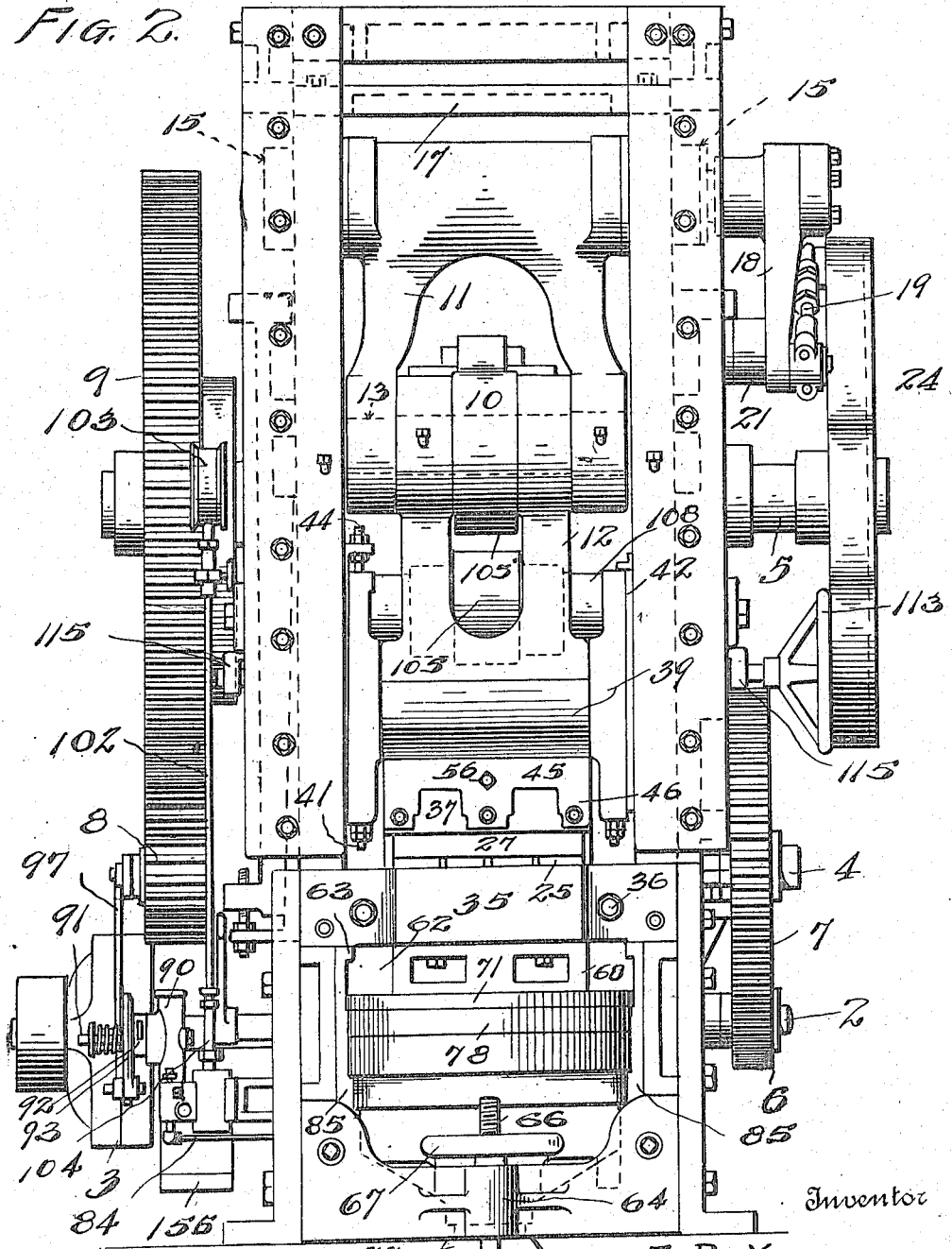

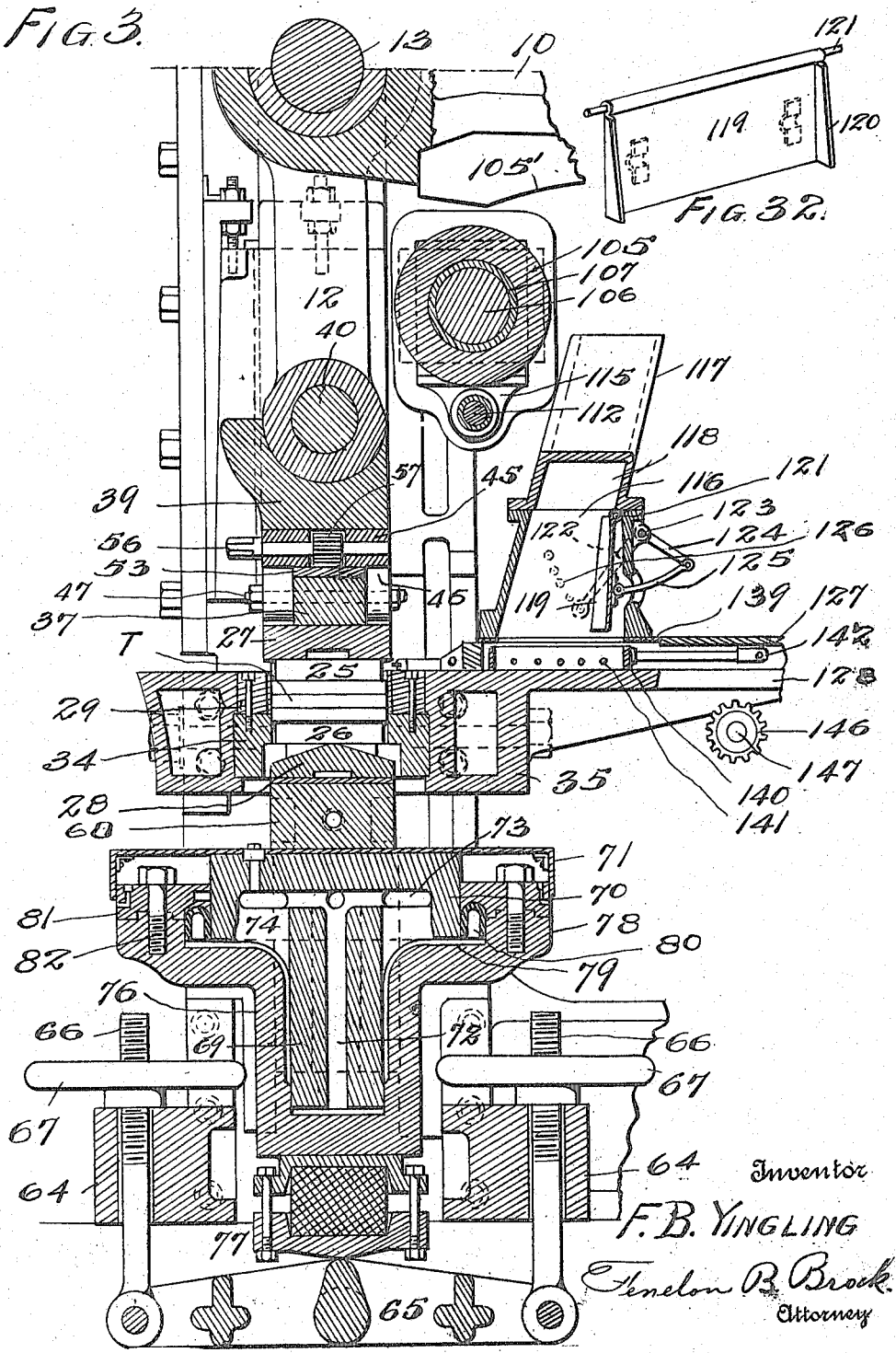

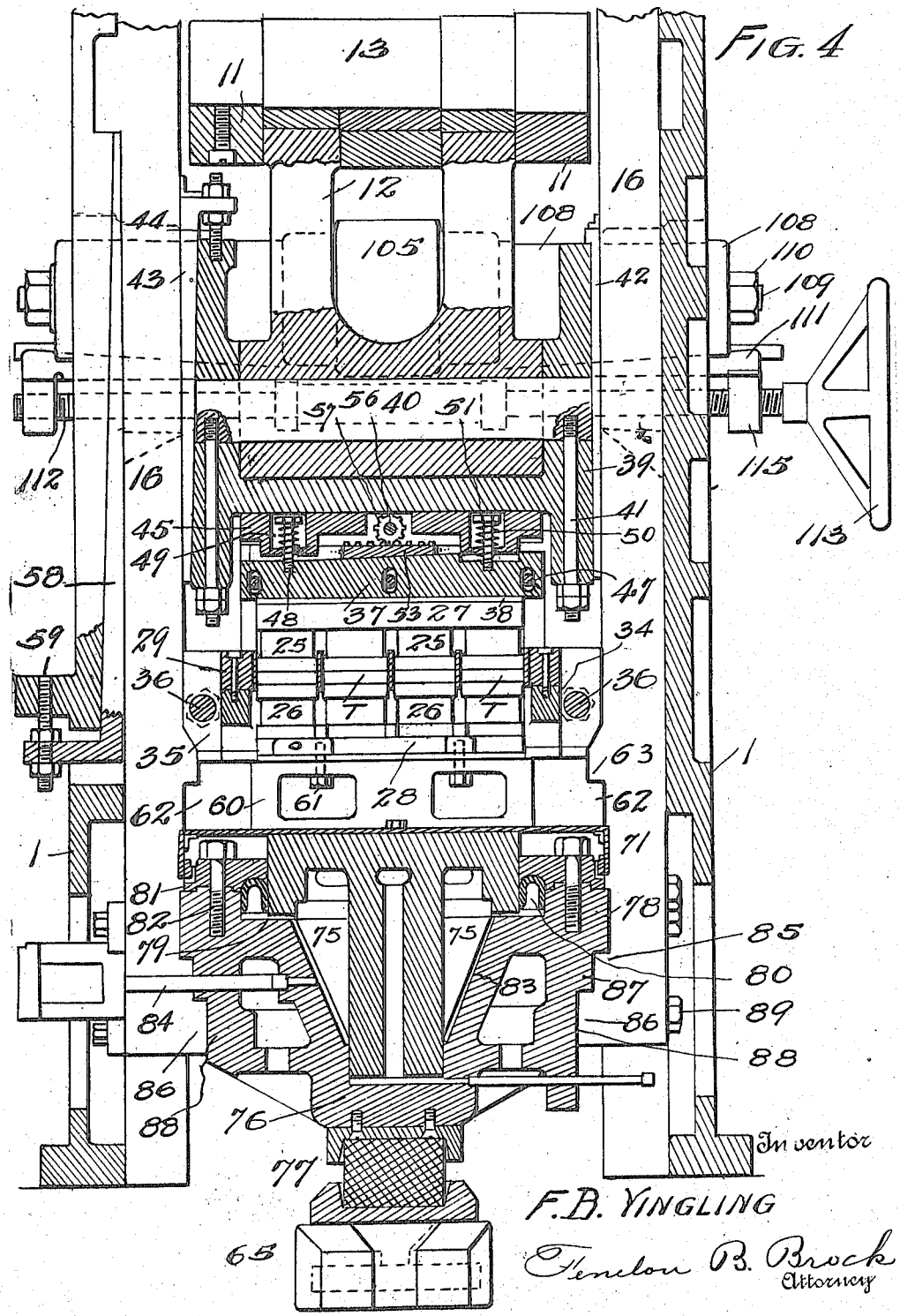

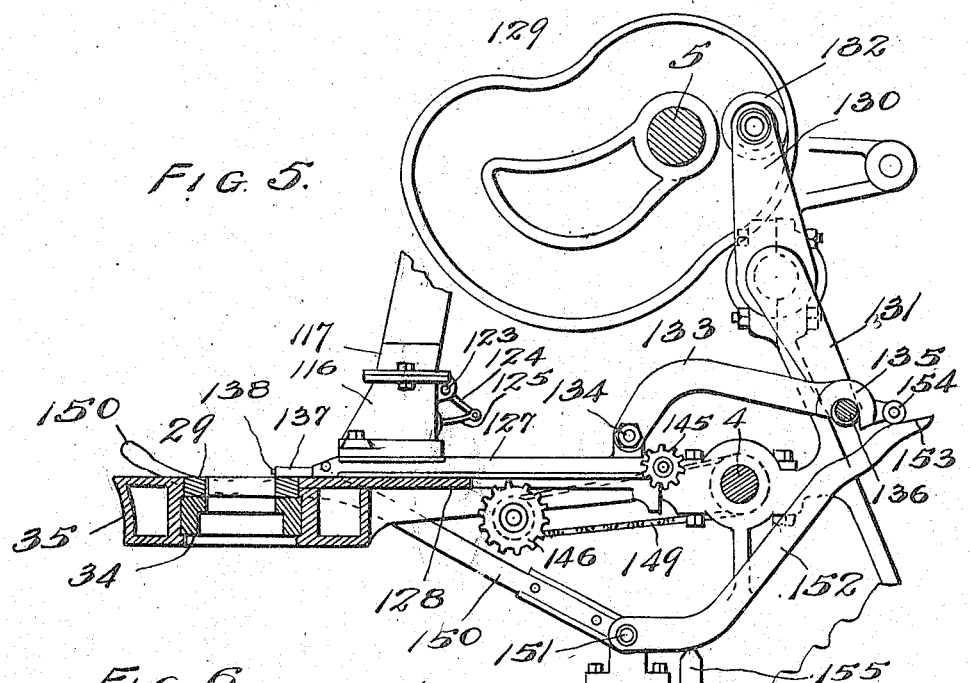
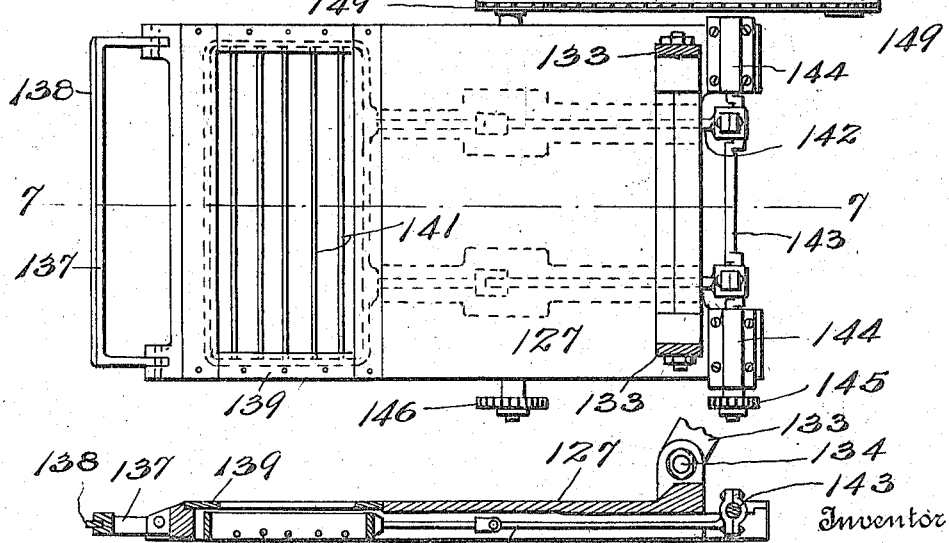

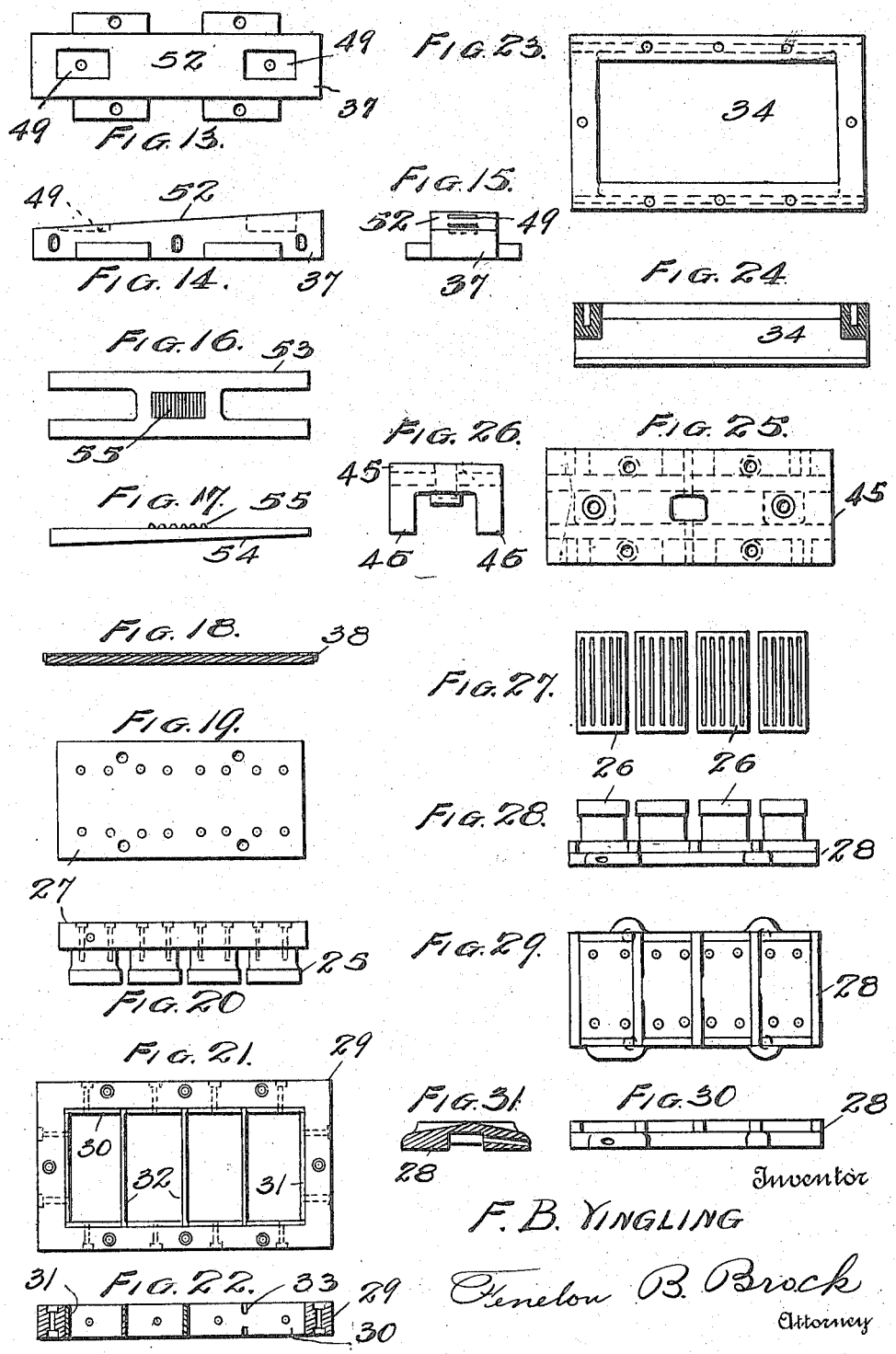

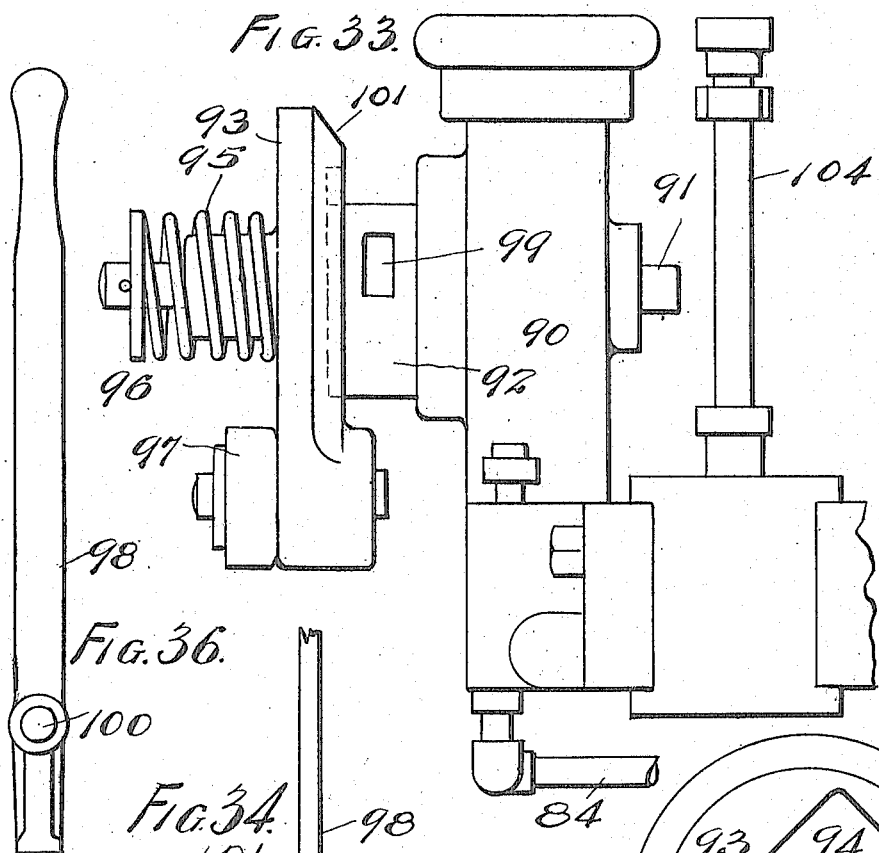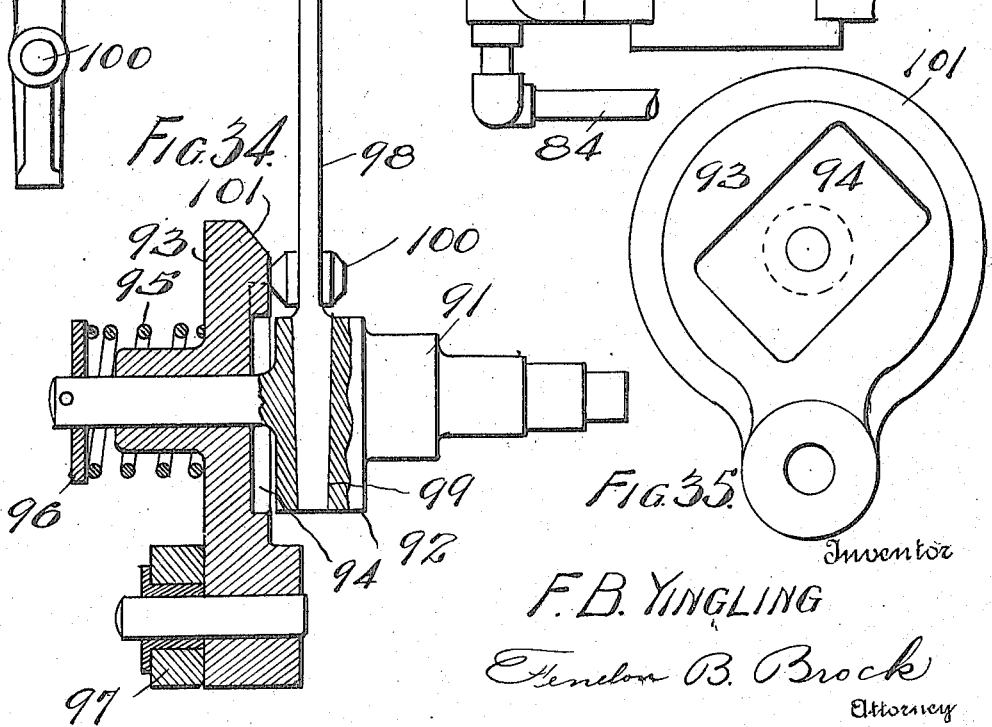

Patented Nov. 18, 1924.

1,515,918

UNITED STATES PATENT OFFICE.

FRANK B. YINGLING, OF HAMILTON, OHIO.

AUTOMATIC TILE PRESS.

Application filed June 20, 1922. Serial No. 569,691.

*To all whom it may concern:*

Be it known that I, FRANK B. YINGLING, a citizen of the United States, residing at Hamilton, in the county of Butler and State of Ohio, have invented certain new and useful Improvements in Automatic Tile Presses, of which the following is a specification.

The subject matter of the present invention relates to that type of machine illustrated in my Patent No. 1,268,909, dated June 11, 1918, the primary object of the invention being to improve machines of that type in several particulars as will be set forth.

In the accompanying embodiment of the power press, the machine is designed to form or fashion four tiles with each operation, and in this instance the tiles are six by three inches in area. Of course the number of tiles molded may be varied, and the sizes of the tiles vary with the use of different dies. By the utilization of my invention the machine may be operated to mold any required number of tiles of the exact same hardness and density, and means are provided for indicating the pressure applied at each impression of the dies, in order to insure this uniformity. Means are also utilized for readily adjusting the relationship between the dies to determine the thickness of the molded tile. In this manner the necessary uniformity in thickness of any number of molded tiles is assured.

The ejecting lower die is equipped with adjusting mechanism for leveling the die with relation to its die ring, as for instance when new or renewed dies are inserted.

The feed of material or dust to the charger box of the machine is also regulated in order that the material may be uniformly distributed in the charger box, and further, means are provided for insuring a uniform distribution of the material or dust in the several molds, or dies. This latter improvement results in the molding of the titles in quantities with each tile composed of a similar amount of material or dust.

The co-operation of parts of the unitary machine thus insures a firm and durable tile which is smooth and without blemishes and fashioned with sharp edges. The molded tiles are uniform in size, shape, density, and weight, as well as in hardness, and their exact similarity insures an attractive, durable and workmanlike appearance when used in the arts or trades.

The above accomplishments are attained by the novel combinations and arrangements of parts of a machine of this character as illustrated in the accompany drawings wherein one physical embodiment of my invention is shown. The drawings depict a machine as actually constructed and operating according to the principles of my invention, it will, however be apparent that changes and alterations may be made therein within the scope of my claims without departing from the spirit of my invention.

Figure 1 is a view in side elevation of an automatic tile press giving the general arrangement of parts, and showing some parts in dotted lines for convenience of illustration.

Figure 2 is a view in front elevation of the machine.

Figure 3 is a central, longitudinal, vertical sectional view, on an enlarged scale, showing parts at the front of the machine, the dies being in closed position.

Figure 4 is a transverse sectional view complementary to the structure of Figure 3.

Figure 5 is a diagrammatic view showing the charging mechanism and its actuating parts.

Figure 6 is a top plan view of the agitated charger mechanism. Figure 7 is a sectional view at line 7—7 of Figure 6.

Figure 8 is a sectional view taken transversely of the machine showing the adjustable fulcrum roller which co-acts with the cam-pitman, to effect simultaneous vertical movement of the dies in ejecting the completed tile from the mold.

Figure 9 is a detail sectional view showing the supporting shaft, with eccentric bearings in side bars of the machine, for the upper member of the toggle mechanism.

Figure 10 is a top plan view of the dust box, and Figure 11 is a longitudinal, vertical sectional view therethrough.

Figure 12 is a detached, side view of the lower plunger.

Figures 13 and 14 show a top plan and side view of the cast iron adjusting block of the upper die.

Figure 15 is an end view of this block.

Figures 16 and 17 are top and edge views of the cast iron, adjusting wedge used with the adjusting block, in the upper die.

Figure 18 is a sectional view of the upper die pad, made up of sheet steel and asbestus.

Figure 19 is a stop plan view of the upper die block, which is electrically heated.

Figure 20 illustrates the upper die block with four dies carried thereby.

Figures 21 and 22 show respectively a top plan and longitudinal, vertical sectional view of the ring of the lower die, illustrating in detail the liners.

Figures 23 and 24 illustrate, in plan and section, the die-ring frame.

Figures 25 and 26 are top plan and end views of a cast iron, electric heating frame, of the upper die. Figure 27 shows four of the lower dies, and Figure 28 shows these dies secured to their die block. Figures 29, 30, and 31 are a top plan, a front edge, and a transverse sectional view of the lower die block. Figures 33, 34, 35, and 36 are enlarged detail views of the hydraulic pump for supplying oil to the press, said views showing the use of manual and power actuated means for operating the pump.

In the form of the invention illustrated in the drawing, the operating parts of the press are supported between a pair of complementary side plates 1, 1, forming the main frame of the machine, and equipped with the necessary bearings and openings for shafts and other parts. The driving shaft 2 which is provided with usual clutch mechanism for control, transmits power to the intermediate countershaft 4 and power shaft 5. A pinion 6 on the drive shaft and gear 7 on the countershaft, together with pinion 8 on the intermediate shaft and large gear wheel 9 on the power shaft, form the gear connections between these shafts.

The upper die which is vertically reciprocable, is actuated from the main power shaft 5, which latter is provided with a crank portion, and connected by the pitman 10 to the upper toggle-yoke 11 and lower toggle-yoke 12, on the pin 13. And the toggle shaft 14 upon which the toggle yoke 11 is pivotally suspended, as seen in Figure 9 is fashioned with a pair of eccentric bearings 15 in the complementary side bars 16, connected at their upper ends by a tie plate 17. These side bars are slidable and vertically adjustable with relation to their supporting frame plates 1, 1, and they support the operating parts of both the upper and lower dies, as best seen in Figure 4. The toggle-supporting shaft 14 is rocked in its eccentric bearings 15 with each revolution of the main power shaft 5, through the instrumentality of a crank arm 18, on one end of the shaft outside the main frame, which arm is connected by an adjustable, sectional rod 19 to one arm 20 of a bell crank lever. The bell crank is pivoted at 21 on one of the side plates 1 and its other lever arm 22 carries a roller 23 that co-acts with a cam 24 revolvable with the power shaft, as seen in Figures 1 and 2. The rocking movement of the shaft 14, it will be understood, imparts a second pressure of the toggle mechanism, and this pressure may be adjusted or varied as desired by adjusting the length of the connecting rod 19 to vary the angle between the crank arms 18 and 20.

In Figures 3 and 4 the tile are indicated by the letter T in the process of formation or molding and with the pressure of the machine applied thereto. Two series of four dies each are shown, the upper dies designated 25 and the lower dies as 26, the former bolted to the upper die block 27, and the latter to the lower die block 28, and arranged in complementary pairs.

The dies co-act for molding the dust within the die ring or mold 29, which as shown in Figures 21 and 22, is a cast metal, rectangular, open member, fitted with liners of plate steel. The liners as shown comprise a pair of side members 30, two end members 31 and three intermediate transverse members 32, the parts being notched as at 33 for interlocking, and retained in the mold by screws as indicated in Figure 21. The mold 29 is supported upon a complementary frame 34, and both these members are rigidly held in the open center table or support 35, made up of sections and joined by bolts 36, which table is embraced within and supported from the main frame (see Figs. 2 and 4).

The upper die block 27 is bolted to and at the underside of an adjusting block 37, a pad 38 being interposed between these members, and as seen in Figure 18, the pad is made of a layer of sheet steel and asbestus or similar material, and fixed between the members, for conserving heat.

The upper die members are carried by the upper cross head 39 in which the pin 40 is fixed as a journal for the lower yoke 12 of the toggle mechanism. As seen in Figure 4 bolts 41 are passed through portions of the cross head and threaded into the journal pin, and wear plates 42 and 43 are located at the sides of the cross head for sliding engagement with the side bars 16. The wear plate 43, it will be noted is wedge shaped, and may be adjusted by means of the stud bolt 44 to vary the friction between the cross head and its guide bars 16, and to compensate for wear.

At the underside of the cross head, which is flattened as seen in Figure 3 for the purpose, is attached as by bolts the upper die frame 45, fashioned as a cast metal plate with depending, perforated side lugs 46, through which are passed clamping bolts 47. These bolts also pass through the adjusting block 37, which is transversely and horizontally perforated, as seen in Figure 14 to accommodate the bolts, and by means of the bolts the adjusting block and die frame are rigidly clamped together, and both these members are rigid with the cross head. As the dies wear during service, they are dressed down to maintain them in proper condition, and to compensate for this decreased thickness of the dies, adjustment between the die frame 45 and the adjusting block 37 is provided for. The holes in the adjusting block 37, through which the bolts 47 pass are made large enough to permit the proper adjustment of the block. The block is suspended from the frame by a pair of spaced bolts 48 threaded into the block with their nuts 51 and upper portions located in a recess 49 of the frame. Springs 50 are interposed between the bolt nuts and the lower walls of the recesses. Upon the upper inclined face 52 of the adjusting block is seated an H-shape wedge 53 (see Figs. 16, 17) having an under, inclined face 54 complementary to the face 52 of the block. The wedge is adapted to be slid backward or forward within the frame and on the block, and is fashioned with a rack 55 on its upper face and central of the wedge. Within the frame is supported a gear shaft 56 with its gear 57 engaging the rack 55, and the shaft is accessible from the front exterior of the machine for turning to shift the wedge. It will thus be apparent that the block and wedge are retained in close contact by their spring connections, and that the position of the upper dies with relation to the upper cross head may be varied by action of the gear shaft, gear, and wedge in connection with the adjusting block. This adjustment regulates the distance between the upper and lower dies, and the supporting members for the upper dies are rigidly clamped together, after adjustment by the bolts or studs 47.

The lower die and its supports are also vertically movable but in a comparatively slight degree with relation to the upper die, the lower die and its supports being supported between the two side bars 16, 16, which are slidable vertically in the main frame. For adjusting the bearing of these side bars in the man frame, a wedge plate 58 is utilized (as in Fig. 4) in connection with the adjusting bolt 59.

The die block 28 of the lower die is supported by the lower crosshead 60, which is secured to the block by bolts 61 and extends transversely of the machine, with end lugs 62 interlocked with complementary lugs 63 of the side bars 16.

The hydraulic cylinder and sliding bars 16 are supported by a stationary stop or abutment 65, as in my Patent No. 1,268,909, dated June 11, 1918, and the support may be adjusted vertically by means of screws 66 which extend upwardly through blocks 64 and are provided with hand wheels 67 for turning the same.

Above the stationary stop and below the lower die, hydraulic mechanism is interposed by means of which the lower cross head 60 is supported, and the necessary pressure from the upper die may be indicated for guidance in regulating the density and hardness of the resulting tile.

The plunger of the lower die comprises a round body 69 and circular head 70, the latter directly beneath the cross head 60, and between the cross-head and the plunger-head, a sheet metal, circular plate 71 is interposed as a dust shield for preventing accumulation of dust on parts of the press below the die. The hollow plunger is cored out at 72, and this open bore communicates by radiating passages 73 (Fig. 3) with the interior of the hollow plunger head 70 to accommodate the hydraulic element forced therein under pressure. Between the plunger head and its body are fashioned diametrically disposed pairs of webs 74 and 75 (see Figs. 3, 4 and 12) for reinforcing the structure and providing the necessary space within the cross head cylinder 76 in which the plunger is seated.

The cross head cylinder has attached at its lower end a shock absorbing block 77 for contact with the abutment 65, and at its upper open end is fashioned with an annular flange 78 forming an inner annular seat 79 for the underside of the plunger head. A U-shaped leather packing ring 80 is employed to seal the joint, and the plunger ring 81 is secured by bolts or studs 82 as shown.

As seen in Figure 4 the cylinder has a pair of tapering recesses 83 complementary to the webs 75 of the plunger for retaining these parts in proper relative position, and adequate space is provided between the plunger and its head and the cylinder to permit entrance of liquid under pressure through inlet pipe 84 (Fig. 4) opening into one of the recesses of the cylinder. Thus the liquid under pressure may be pumped into the cylinder cross head and fill the space around and within the plunger body and under the plunger head, to form a rigid support for the plunger head and cross head 60 supported from the cylinder head.

The cylinder cross head is rigidly suspended from the two side bars 16 by means of lugs 85 and 86 at the lower ends of these bars, which lugs engage under complementary attaching lugs 87 and 88 cast at the exterior of the cylinder and projected diametrically therefrom. Bolts 89 are employed to rigidly secure the bars and attaching lugs in order that the lower die may be elevated by movement of the side bars to eject the completed tile.

The liquid may be supplied to the cross head cylinder from a pump 90 that may be manually operated as well as operated by power from the intermediate shaft 4. A pump of the oscillating type is shown in operative relation to the press in Figure 2, and in detail in Figures 33 through 35, where its shaft 91 is provided with an enlargement or rectangular head 92 extending transversely of the shaft. The shaft is equipped with a clutch device including a power pump lever 93 loose thereon and fashioned with a socket 94 to normally engage over the head 92, and a spring 95 coiled about the shaft and interposed between the lever and a fixed washer 96 on the shaft urges the lever into engagement with the shaft. The rod 97 connects the lever 93 with the intermediate shaft 4, and the pump is thus actuated from the press when the latter is in operation.

To obtain an initial hydraulic pressure within the lower die support, a hand operated lever 98 is utilized for actuating the pump, independent of the power actuating mechanism. This manual lever 98 is adapted to be inserted in the socket 99 of the shaft head 92, and near its head the lever is fashioned with a double cam-head 100 adapted to engage a complementary bevel edge 101 on the pump lever 93. Thus, as the manual lever is applied to oscillate the pump shaft, the engagement of the parts 100 and 101 pushes the lever outwardly on the shaft 91 against tension of the spring 95. This action disengages the recessed power lever from the shaft head, and thus uncouples the power actuated mechanism from the pump. When thus uncoupled the pump may be actuated by manipulating the handle or hand lever to force the liquid under pressure through the pump and inlet pipe 84 to the lower die support. When the hand lever is removed, the spring 95 returns the power lever to engagement with the pump shaft, and when the press is actuated the lever is oscillated from shaft 4. The press then maintains, through the actuated pump, a predetermined hydraulic pressure in the circulation system.

A stand pipe 102, equipped with a gage 103, is utilized to indicate the pressure of liquid furnished to the cylinder of the lower die plunger. By consulting this hydraulic indicator, the pressure applied at each impression of the dies may be ascertained, and when found to be the desired pressure, it will be apparent that this pressure may subsequently be maintained to insure tile of uniform density and hardness. Other presses may also be set at a similar hydraulic pressure, to insure the formation of tile of uniform thickness and hardness, when a series of presses are being utilized for the production of similar tile.

The liquid, as it is destributed through the circulation system, overflows through a safety valve, indicated at 104 in Figure 3, and may be emptied into a suitable supply tank.

As the machine operates, the pressure, applied through the action of the toggle mechanism of the upper die, is imparted through the dust in the dies and concentrated on the lower die, and thence transmitted through the cross head 60 and plunger 69 to the lower die support. The mechanical pressure exerted on the plunger within the cross head cylinder 76 is received and transmitted to the cylinder, and the pressure of the liquid which receives mechanical pressure is indicated on the gage.

In the machine illustrated the area of the plunger is double that of four tile. Thus if the pressure indicated on the gage is 1000 lbs. per square inch indicating the hydraulic pressure within the cross head cylinder, the actual pressure exerted on the tile by the toggle mechanism will be 2000 lbs. per square inch. The safety valve 104 is therefore set at a predetermined pressure and the maximum pressure that can be safely exerted on the tile may thus be regulated.

In operation of the machine, the first pressure applied by the action of the toggle mechanism, through the descending upper die forces the air from the dust in the mold. Then a second and final pressure is exerted to finish the tile, and the intensity of this final pressure is regulated by the safety valve 104.

The press is capable of adjustment for use when new dies or different dies are used, and by means of mechanism for leveling the lower die with the die ring 29 at the time the lower die is at its elevated or highest position, after having ejected the completed tile. This adjustment accommodates the press to the use of worn dies, also, which have been dressed, or to the use of sets of dies of varying height substituted for previously used dies, and insures that the dies shall rise with their top faces flush with the plane of the die ring 29. For this purpose adjustable bearing supports are provided for the extractor roller 105 (see Fig. 8) which co-operates with the cam face 105' on the lower edge of the pitman 10, to effect the simultaneous vertical movement of both the upper and lower dies to extract the completed tile. In connection with the toggle movement the lower die is maintained in its uppermost position when the cam face 105' is resting on or riding over the extractor roller.

The roller is journaled at the center of the shaft 106, a bushing 107 being interposed between the roller and its shaft to compensate for wear. The ends of the shaft are seated in complementary roller-blocks 108, and the reduced threaded extensions of the shaft at 109 are clamped to the blocks by nuts 110. The blocks project through openings provided therefor in the side plates of the main frame of the press, and rest upon horizontally disposed slidable wedges 111 that are movable longitudinally of the shaft to adjust the latter in a vertical plane. These wedges are moved toward or away from the longitudinal center of the shaft to elevate or lower the shaft by means of a screw bar 112 and its attached hand wheel 113. The bar has collars thereon which prevent endwise movement of the bar with respect to the main frame, and right and left hand screw threads that respectively engage fixed nuts 114 retained in the frame plates, and movable nuts 115 integral with the respective adjusting wedges, to control the wedges. While the machine is at rest, with the cam face 105' of the pitman 10 bearing upon the roller 105, it will be apparent that by turning the hand wheel, the lower die, through the pitman, toggle yoke 11, its shaft 14, and side bars 16, the lower die and its support may be raised to bring the tops of the dies 26 flush with the top of the ring 29.

The material for the tile, in the form of powdered clay or dust is supplied to the machine through an elevator as indicated by dotted lines in Figure 1, and successive charges of material are fed to the dies, and the completed tile pushed or ejected from the press by mechanism best illustrated in Figures 3, 5, 6, and 7, &c.

The material for the tile is received into the dust box or receptacle 116, through its upper section 117 which is fashioned with a pair of distributing inlet tubes 118 that spread to the area of the box 116 (see Figs. 10, 11). The material is fed to the dies by a reciprocable charging device, and as the dust is fed to the dies it is agitated in order to insure proper and uniform distribution of the material. The reciprocal action of the charging device, unless proper provision is made to prevent it, has a tendency to pack the material which packing would result in a tile lacking uniformity in density. Therefore provision is made in the dust box 116, for guiding and distributing the material or dust as it falls to the charger, in the form of a valve 119, which valve is preferably of sheet metal having end flanges 120. The valve is suspended or hinged at 121 in the upper part of the lower dust box section, and may be swung toward the front or rear of the dust box as desired. The valve performs the function of a distributer and as it is located at the rear of the box it may be swung forward to adjusted position by operating an exterior lever 122. This lever is attached to the shaft or rod 123 journaled at the rear of the box and parallel with the hinge of the distributing valve, and lever arms 124 on the shaft are connected to the distributing valve by hooks 125 passing through openings therefor in the rear wall of the box. The operating lever may have a resilient detent thereon to engage in recesses or indentations 126 on an exterior face of an end wall of the dust box to retain the distributer in adjusted position in the box.

The charging device, which reciprocates beneath the open bottom of the dust box includes a carriage formed as a flat plate or charger 127 movable over the table 128. In Figure 5 it will be seen that the charger is reciprocated from the power shaft 5 by means of a cam member or disk 129 thereon, and a cam arm 130 is employed to oscillate the yoke 131. The cam arm is provided with an anti-friction roller 132, and the arm and yoke are journaled to oscillate in bearings in the main frame of the press. A pair of angular connecting links 133 are spaced apart and pivoted to perforated ears 134 provided at the rear corners of the charger, and at their free ends these links have hooks or sockets 135 that normally straddle the horiontally disposed pin 136 which connects the arms of the yoke 131 to provide a rigid U-shaped yoke. By the action of the cam disk 129 as the latter is revolved with the shaft 5, it will be apparent that the charger is alternately pushed forward to the front of the press to charge the dies and deliver completed tile, and then returned to retracted position by the co-action of the curved track of the cam disk and the roller or cam wheel 132. At its forward end a U-shaped frame 137 is projected from the charger and provided with a fender or push bar 138 of rubber or other soft material, to contact with the completed tile after they are extracted or ejected from the dies, and deliver the completed tile for further handling. The forward, open end of the charger reciprocates or slides beneath the open bottom of the dust box, wear plates or liners 139 being arranged about the rectangular opening in the charger, as shown in Figs. 6 and 7.

In connection with the charging device a dust agitating device is employed, which comprises a grid-frame 140 located in the opening in the front of the charger and is provided with spaced agitating bars or rods 141 extending from side to side of the agitator grid-frame. The agitator is carried by and reciprocated longitudinally of the charger as the latter reciprocates. At the rear of the agitator frame a pair of rods 142 are connected and these rods pass beneath the charger and are connected with a crank shaft 143, the latter journaled in bearings 144 at the rear end of the charger. On the crank shaft, preferably at one end is fixed a clash gear wheel 145, that is designed to intermittently engage a complementary driven gear 146 on the driven sprocket shaft 147. The sprocket shaft has stationary bearings at the under side of the table 128, and is driven from the intermediate shaft 4 by sprocket wheel 148, chain 149, and the sprocket wheel 149' on the shaft 147.

For disconnecting the charger and agitator and throwing them out of operation, a lever 150 is employed. This lever is fixed to the rock shaft 151 suitably journaled in the main frame, and the rock shaft is equipped with a pair of rock arms 152. At their rear, free ends, these rock arms are each provided with an upper cam edge 153 adapted to contact with an anti-friction roller 154. The rollers are journaled at the free ends of the angular links 133, beyond their hooked portions 135. Normally the rock arms 152 rest upon a stop or abutment 155 supported from a stationary part of the main frame, and it will be apparent in Figure 5 that by pushing down on the free end of the lever 150, the rock arms 152 are swung upwardly, and through the connection at the cam edges 153 and rollers 154, the hooked angular links 133 will be swung on their pivots 134, thus freeing the links from the cross bar 136 of the cam yoke. With the agitating mechanism of the charger and agitator thus disengaged, access may readily be had to these devices without necessarily stopping the machine.

This also facilitates cleaning the dies as the charger can be readily disengaged and the dies brought to the place necessary to clean them without the charger acting to carry the dust forward, as is the case in the operation of the press.

In Figures 1, 2 and 3, the parts of the machine are shown in position occupied at the end of the first compression stroke of the toggle mechanism and upper die, the pitman 10 being swung horizontally to right and left in Figure 1 by the action of the crank shaft or power shaft 5, as it revolves clockwise. The toggle is alternately straightened and flexed by the action of the pitman to vertically reciprocate the upper die and the lower die, the action of the lower die being comparatively only a slight movement relative to the upper die. Thus the charge of dust in the lower die is subjected to two compression actions by a single rotation of the power shaft 5. The second or final compression of the tile being materially heavier than the first compression.

The eccentric toggle supporting shaft 14 is revolved in its bearings in the side bars 16 during each rotation of the shaft 5, through the cam action of the disk 24 and connections therefrom to the shaft as shown.

The second compression of re-press movement first lowers the upper die, and then raises the lower die by action of the cam 105' of the pitman 10, as this cam contacts with the roller 105.

The detailed movement of parts are not given in full herein and reference may be had to my former patent above referred to No. 1,268,909, for such details.

Some details of construction and minor accessories, such as means for heating the die members, by steam or electricity to maintain these members at proper temperature for working the dust, are illustrated but not elaborated in the description in the interest of brevity.

The complete circulation system of oil in the lower die members whereby the excess oil may be returned to the oil supply tank indicated at 156, is not shown, but the relation of the pump and the hydraulic mechanism of the lower die, together with the indicator mechanism will be readily understood.

Suitable lubricating means are provided for all operating parts, as for instance oil ducts 157 are indicated in dotted lines and full lines in roller shaft 106, which may be supplied with oil from the oil cup or attachment 158, and numerous other accessories necessary for proper operation of the automatic tile press are of course used or contemplated.

Having thus fully described my invention, what I claim as new and desired to secure by Letters Patent is—

1. In a tile press the combination with an upper die and a lower die and means for reciprocating said dies, of means affording hydraulic pressure for supporting the lower die and receive the weight of a compression stroke of the upper die, and means for indicating said hydraulic pressure.

2. In a tile press the combination with a reciprocable upper die and a lower die and means for operating said upper die, said lower die including hydraulic means for receiving the weight of a compression stroke of the upper die, and a pressure indicator connected with the hydraulic means for indicating the pressure of the upper die.

3. In a tile press, the combination with a reciprocable upper die and a lower die and operating means therefor, said lower die including a hollow support, a plunger in said support for supporting the lower die, means for introducing fluid under pressure between said plunger and hollow support, and means for indicating said fluid pressure.

4. In a tile press a hollow support and a plunger therein for supporting a lower die, a pump for introducing fluid under pressure between said support and plunger, means operated from the press for actuating said pump, and connections to said pump for alternate manual operation thereof.

5. In a tile press, a hollow support and a plunger therein for supporting a lower die, a pump for introducing fluid under pressure between said support and plunger, means for indicating such fluid pressure, and a safety valve connected to the pump for relief of excessive fluid pressure.

6. In a tile press, a hollow support and a plunger therein for supporting a lower die, a pump for introducing fluid under pressure between said support and plunger, means operated from the press for actuating said pump, connections to said pump for alternate manual operation thereof, means for indicating the fluid pressure between said support and plunger, and a safety valve connected to said pump for regulating the hydraulic pressure.

7. In a tile press, a lower die support comprising an open cylinder-cross-head, and an open head to said cylinder, a hollow plunger in said cylinder having a head forming spaces for fluid under pressure beneath the plunger head, means for supplying fluid under pressure to said spaces, and means for indicating said pressure.

8. In a tile press the combination with a reciprocable cross-head, and rigidly connected dies, die block, and adjusting block, of a die frame carried by said head, and means interposed between said adjusting block and frame for varying the distance there between to adjust the dies.

9. In a tile press the combination with a reciprocable cross-head, and rigidly connected dies, die block and adjusting block, of a die frame carried by said head, means for rigidly supporting said adjusting block from said frame, resilient means for suspending said adjusting block from said frame in the absence of said rigid support, and means for adjusting the distance between said adjusting block and frame when said block is so suspended.

10. In a tile press the combination with a reciprocable cross head and die frame, of an adjusting die-block and dies, supported from said frame, and a wedge block for varying the distance between said frame and adjusting block.

11. In a tile press the combination with a reciprocable cross head and die frame, of an adjusting-block and dies, detachable means for connecting said frame and adjusting block, an adjusting wedge interposed between said frame and block, and means for moving said wedge to vary the distance between the frame and adjusting block.

12. In a tile press the combination with a reciprocable crosshead and die frame having recesses therein, of an adjusting block having an inclined face, spring pressed bolts connecting the die frame and adjusting block, a wedge interposed between the adjusting block and frame, a rack on the wedge, and a rack wheel engaging said rack.

13. In a tile press, the combination with reciprocable upper and lower dies, and means for moving said lower die relatively to the upper die, a die ring co-acting with the lower die, and means for leveling said lower die relatively to the die-ring at the time the lower die is at its maximum height.

14. In a tile press, the combination with reciprocable upper and lower dies, a die ring for the lower die, and means including a pitman and toggle mechanism for operating the dies, of an adjustable abutment adapted to co-act with said pitman for moving the lower die relatively to the die ring for leveling said die with the die ring.

15. In a tile press the combination with a reciprocable upper and lower die, and means including a pitman for actuating said dies, of a tile extracting device adapted to frictionally co-act with said pitman, and means for vertically adjusting said roller with relation to said pitman.

16. In a tile press the combination with a reciprocable upper and lower die, and means including a pitman for actuating said dies, of a tile-extracting roller adapted to frictionally co-act with said pitman, a shaft for said roller, bearing blocks for said shaft, means for adjusting said blocks, and actuating means therefor.

17. In a tile press the combination of a tile-extracting roller and its shaft, bearing blocks for said shaft, a frame, adjusting wedges in said frame for supporting said blocks, and means for moving said wedges to adjust the roller.

18. In a tile press the combination of a tile-extracting roller and its shaft, bearing blocks for said shaft, a frame, adjusting wedges in said frame for supporting said blocks, and a screw bar having right and left hand threads engaging said wedges and frame for simultaneously adjusting said wedges.

19. In a tile press, the combination with a charging device, of a dust box located in operative relation thereto, and means within said box for distributing dust as it is fed to said charging device.

20. In a tile press the combination with a dust box, of a charging device reciprocable beneath said box, a distributing plate hinged at the rear of said box adapted to control the movement of dust to said charging device, and means for supporting said hinged plate in adjusted position.

21. In a tile press the combination with an open bottom dust box and a charging device reciprocable beneath said dust box, a plate hinged within said box and adapted to control the area of the opening in the bottom of said box, an exterior shaft and means for holding said shaft in adjusted position, crank arms on the shaft, and links connecting said arms with said plate.

22. In combination, a mechanically actuated power press, a dust receiving receptacle having an adjustable discharge opening, a reciprocating and agitating dust charger box to receive and deposit said dust into a tile mold, an adjustable top die mechanism for regulating the thickness of the tile to a predetermined gauge, and hydraulic pressure mechanism for indicating the pressure for producing tile of a uniform density and size at a predetermined pressure.

23. In combination a power tile press, a dust receiving receptacle, and adjustable discharge opening discharging intermittently into a reciprocating dust box, means for imparting an agitating motion to said dust box when same is located over a mold cavity, a hydraulically supported lower die, and an adjustable upper die for limiting the distance that the upper die approaches the lower die in the pressing operation for forming tile of a uniform density and size at a predetermined pressure.

FRANK B. YINGLING.